United States Patent [19]

Kolts et al.

[11] Patent Number: 4,670,134

[45] Date of Patent: Jun. 2, 1987

[54] CATALYTIC HYDROFINING OF OIL

[75] Inventors: John H. Kolts; Brent J. Bertus, both of Bartlesville, Okla.; Daniel M. Coombs, Borger, Tex.

[73] Assignee: Phillips Petroleum Company, Bartlesville, Okla.

[21] Appl. No.: 858,972

[22] Filed: May 2, 1986

[51] Int. Cl.[4] .................. C10G 45/00; C10G 45/04
[52] U.S. Cl. .................... 208/251 H; 208/213; 208/216 PP; 208/254 H; 208/122
[58] Field of Search ............ 208/251 H, 213, 216 PP, 208/254 H, 122

[56] References Cited

U.S. PATENT DOCUMENTS

| | | | |
|---|---|---|---|
| 2,449,050 | 9/1948 | Bond | 208/122 |
| 3,383,305 | 5/1968 | Rogers et al. | 208/254 |
| 3,493,517 | 2/1970 | Jaffe | 252/437 |
| 3,645,915 | 2/1972 | Stiles | 252/462 |
| 3,699,036 | 10/1972 | Hass et al. | 208/111 |
| 3,716,475 | 2/1973 | Csicsery et al. | 208/59 |
| 3,983,029 | 9/1976 | White | 208/59 |
| 3,985,684 | 10/1976 | Arey, Jr. et al. | 252/469 |
| 3,992,468 | 11/1976 | Cosyns et al. | 260/672 R |
| 4,014,821 | 3/1977 | Hammer | 252/470 |
| 4,045,331 | 8/1977 | Ward | 208/213 |
| 4,102,777 | 7/1978 | Wheelock | 208/122 |
| 4,177,163 | 12/1979 | Oleck et al. | 252/439 |
| 4,268,415 | 5/1981 | Mohan et al. | 252/413 |
| 4,362,653 | 12/1982 | Robinson | 252/455 R |
| 4,369,108 | 1/1983 | Bertolacini et al. | 208/122 |
| 4,405,443 | 9/1983 | Bertolacini et al. | 208/113 |
| 4,431,749 | 2/1984 | Hettinger, Jr. et al. | 502/68 |
| 4,437,978 | 3/1984 | Chester et al. | 208/120 |
| 4,486,295 | 12/1984 | Inooka | 208/96 |
| 4,492,626 | 1/1985 | Kukes | 208/251 H |
| 4,582,595 | 4/1986 | Aude et al. | 208/251 H |

*Primary Examiner*—John Doll
*Assistant Examiner*—Helane Myers
*Attorney, Agent, or Firm*—K. K. Brandes

[57] ABSTRACT

Hydrocarbon-containing feed streams, which contain at least about 5 ppmw nickel and at least about 10 ppmw vanadium, are hydrodemetallized either (I) in the presence of a catalyst composition consisting essentially of (a) a support material (preferably alumina), and (b) at least one lanthanide metal compound (preferably $CeO_2$ and/or $Ce_2O_3$); or (II) in the presence of a catalyst composition comprising (a) a support material (preferably alumina), (b) at least one lanthanide metal compound (preferably $La_2O_3$) and (c) at least one manganese compound (preferably at least one manganese oxide).

20 Claims, No Drawings

CATALYTIC HYDROFINING OF OIL

BACKGROUND OF THE INVENTION

This invention relates to catalytic hydrotreating of liquid hydrocarbon-containing feed stream, in particular heavy petroleum fractions.

The use of supported transition metal compounds as catalysts for hydrotreating (e.g., demetallizing, desulfurizing, denitrogenating, hydrocracking) liquid hydrocarbon feed streams, especially heavy oils, is well known. However, there is an ever present need to employ catalysts that are less expensive and/or more effective in removing metals, sulfur and other impurities from such feed streams than those presently employed. The removal of these impurities is desirable because they can poison catalysts in downstream operations such as catalytic cracking and can cause pollution problems when hydrocarbon products from these feed streams are used as fuels in combustion processes.

SUMMARY OF THE INVENTION

It is an object of this invention to provide an effective hydrofining process. It is another object of this invention to employ an effective catalyst composition for the removal of nickel and vanadium from hydrocarbon-containing oils. Other objects and advantages will be apparent from the detailed description and the appended claims.

In accordance with this invention, a substantially liquid hydrocarbon-containing feed stream, which contains at least 5 ppmw nickel and at least 10 ppmw vanadium, is simultaneously contacted with a free hydrogen containing gas and a catalyst composition consisting essentially of (a) a support material selected from the group consisting of alumina, silica and silica-alumina and (b) at least one compound of at least one lanthanide metal (i.e., one lanthanide metal or mixtures of two or more thereof), under such contacting conditions as to obtain a hydrocarbon-containing product stream having reduced levels of nickel and vanadium. Preferably, catalyst component (a) is alumina and catalyst component (b) is at least one of lanthanum oxide and cerium oxide, more preferably cerium oxide (i.e., at least one of $CeO_2$ and $Ce_2O_3$).

Also in accordance with this invention, a substantially liquid hydrocarbon-containing feed stream, which contains at least about 5 ppmw nickel and at least about 10 ppmw vanadium, is simultaneously contacted with a free hydrogen containing gas and a catalyst composition comprising (preferably consisting essentially of) (a) a support material selected from the group consisting of alumina, silica and silica-alumina, (b) at least one compound of at least one lanthanide metal and (c) at least one compound of manganese, under such contacting conditions as to obtain a hydrocarbon-containing product stream having reduced levels of nickel and vanadium. In a preferred embodiment, catalyst component (a) is alumina, catalyst component (b) is at least one of lanthanum oxide and cerium oxide (more preferably $La_2O_3$), and catalyst component (c) is at least one oxide of manganese.

DETAILED DESCRIPTION OF THE INVENTION

Suitable hydrocarbon-containing feed streams that are substantially liquid at the contacting conditions of the hydrotreating process of this invention include crude oil and fractions thereof, petroleum products, heavy oil extracts, coal pyrolyzates, liquefied coal products, products from tar sands, shale oil and shale oil product and the like. The hydrotreating process of this invention is particularly suited for treating heavy feed streams, in particular heavy crude oil and heavy petroleum fractions such as resids, which generally boil (under 1 atm pressure) at a temperature above 400° F., preferably above 600° F., and generally contain about 5–500 ppmw (preferably about 10–250 ppmw) nickel and about 10–1000 ppmw (preferably about 20–500 ppmw) vanadium. Generally these heavy oils and resids also contain sulfur (e.g., 0.2–5 weight-%), nitrogen (e.g., 0.05–2 weight-%), oxygen (e.g., about 0.05–2 weight-%), Ramsbottom carbon residues (e.g., 3–15 weight-%) and have an $API_{60}$ gravity of about 3–20. The term "ppmw" as used herein means parts by weight of Ni or V per million parts by weight of hydrocarbon-containing feed. The feed may contain water (e.g., about 5–20 weight-% $H_2O$).

The hydrotreating process of this invention can be carried out in any apparatus whereby an intimate contact of the catalyst composition with the hydrocarbon-containing feed stream, which is substantially liquid at the contacting conditions, and a free hydrogen containing gas is achieved, under such conditions as to produce a hydrocarbon-containing product having a reduced level of both nickel and vanadium. Generally, lower levels of sulfur nitrogen, oxygen and Ramsbottom carbon residue are also attained in this hydrotreating process. The hydrotreating process can be carried out using a fixed catalyst bed (presently preferred) or in a fluidized catalyst bed or in a moving catalyst bed or in an agitated slurry of the catalyst in the oil feed. The hydrocarbon hydrotreating process can be carried out as a batch process (such as in a pressured autoclave) or, preferably, as a continuous process (such as in a tubular reactor containing one or more catalyst beds).

The catalyst compositions employed in this invention can be used alone in a reactor or can be used in combination with essentially unpromoted refractory materials such as alumina, silica, titania, zirconia, magnesia, metal silicates, metal aluminates (such as zinc aluminate), aluminosilicates, and metal phosphates (such as $AlPO_4$, $Zr_3(PO_4)_2$). Alternating layers of the refracting material and of the catalyst composition can be used, or the unpromoted catalyst composition can be mixed with the unpromoted refractory material. Use of the unpromoted refractory material with the catalyst composition provides for better dispersion of the hydrocarbon containing feed stream.

Also, other catalysts such as known hydrogenation and hydrotreating catalysts (e.g., $CoO/MoO_3$ on alumina, $NiO/MoO_3$ on alumina or $NiO/CoO/MoO_3$ on alumina) may be used with the catalyst composition of this invention to achieve simultaneous demetallization, desulfurization, denitrogenation, hydrogenation and hydrocracking, if desired. At present, the presence of the above described other hydrogenation/hydrotreating catalysts in the process of this invention is not a preferred feature.

Any suitable reaction (contacting) time, i.e., the time of intimate contact of hydrocarbon-containing feed, hydrogen containing gas and catalyst composition, can be utilized. Generally, the reaction time will range from about 0.05 to about 10 hours, preferably from about 0.25 to about 5 hours. Thus, the flow rate of the hydrocarbon-containing feed stream in a continuous operation should be such that the time required for the passage of the feed through the reactor will be in the range of about 0.05 to about 10 hours, preferably 0.25-5 hours. In a continuous fixed bed operation, this generally requires a liquid hourly space velocity (LHSV) in the range of about 0.10 to about 20 cc of feed per cc of catalyst per hour, preferably from about 0.2 to about 4.0 cc/cc/hr.

The hydrotreating process employing the catalyst composition of the present invention can be carried out at any suitable temperature. The reaction temperature will generally be in the range of about 250° C. to about 550° C. and will preferably be in the range of about 350° C. to about 450° C. Higher temperatures do improve the removal of nitrogen and other impurities, but excessively high temperatures that will have adverse effects on the hydrocarbon-containing feed stream, such as excessive coking, will usually be avoided. Also, economic considerations will usually be taken into account in selecting the operating temperature. Lower temperatures can generally be used for lighter feeds such as cycle oils.

Any suitable pressure may be utilized in the hydrotreating process of this invention. The reaction pressure will generally be in the range of about atmospheric pressure (0 psig) to up to about 5,000 psig. Preferably, the pressure will be in the range of about 100 to about 2500 psig. Higher pressures tend to reduce coke formation, but operation at high pressure may have adverse economic consequences.

Any suitable quantity of hydrogen gas can be added to the hydrotreating process. The quantity of hydrogen gas used to contact the hydrocarbon-containing feed stock will generally be in the range of about 100 to about 10,000 standard cubic feet $H_2$ per barrel of the hydrocarbon containing feed stream and will more preferably be in the range of about 1000 to about 6000 standard cubic feed per barrel of the hydrocarbon containing feed stream. It is understood that any free hydrogen containing gas can be employed, such as mixtures of hydrogen with $N_2$, $CH_4$, CO, $CO_2$, $H_2S$ and the like. But preferably, substantially pure $H_2$ is used.

In one embodiment, the catalyst composition employed in the hydrotreating process of this invention consists essentially of (a) alumina and (b) a compound (preferably an oxide) of at least one element having an atomic number in the range of 57 through 71, preferably La and/or Ce (more preferably at least one of $CeO_2$ and $Ce_2O_3$).

In another embodiment, the catalyst composition employed in the hydrotreating process of this invention comprises (preferably consists essentially of) (a) alumina, component (b) as defined above and additionally (c) an oxide of manganese. Examples of preferred catalyst component (b) are $La_2O_3$, $Ce_2O_3$ and $CeO_2$; examples of preferred catalyst component (c) are MnO, $Mn_2O_3$, $MnO_2$, $Mn_3O_4$, $Mn_2O_7$.

Any suitable weight proportions (based on the entire catalyst composition) of the various catalyst component can be employed. Generally, catalyst component (b) is present in the range of about 0.5 to about 10.0 weight-%, preferably from about 1.0 to about 5.0 weight-%; and catalyst component (c) is present in the range of from about 0 to about 5 weight-%, preferably from about 0.2 to about 5.0 weight-%, more preferably about 0.3-3.0 weight-%.

Generally the surface area (determined by the BET/$N_2$ method; ASTM D3037) of the finished catalyst composition is in the range of from about 20 to about 400 $m^2/g$, preferably from about 100 to about 250 $m^2/g$. The prepared composition of matter can be pelletized or compacted into various shaped (e.g., spherical, cylindrical, trilobal) for convenient shipping and use in fixed beds.

The catalyst composition used in the hydrotreating process of this invention can be prepared by any suitable method, such as coprecipitation or impregnation. For example, coprecipitates of hydroxides and/or carbonates of aluminum, a lanthanide metal and, preferably, manganese, can be formed by adding a base (e.g., NaOH) or a water soluble carbonate or bicarbonate (e.g., $NaHCO_3$) to an aqueous solution containing compounds of Al, lanthanide and, optionally, Mn. The thus formed coprecipitate can be separated, washed, dried and calcined at a temperature high enough to convert the compounds of Al, lanthanide and, optionally, Mn to oxides of Al, lanthanide and, optionally, Mn.

The presently preferred catalyst preparation is carried out by impregnation of the support material (a), more preferably alumina, with a solution (preferably aqueous) of at least one lanthanide compound and, preferably, manganese. The thus impregnated material is preferably dried (generally at 20°-200° C.) and then calcined at a temperature high enough to convert the at least one lanthanide compound and, if present, the manganese compound to oxides of lanthanide and manganese, under such condition as to enhance the catalytic activity of the dried, impregnated material. Typical calcining conditions comprise a temperature in the range of from about 250° C. to about 800° C., more preferably from about 300° C. to about 600° C., and a heating time of from about 1 to about 20 hours, preferably from about 2 to about 10 hours. The calcination can be carried out in an inert atmosphere (e.g., in $N_2$ or He) or in a reducing atmosphere (e.g., in $H_2$ or CO) or, preferably, in an oxidizing atmosphere (such as in air or any other free oxygen containing gas mixture).

The support material, preferably alumina, used in the preparation of the catalyst composition by impregnation can be substantially pure or partially hydrated forms of alumina (preferred), silica or silica-alumina. Generally the surface area (determined by BET/$N_2$; ASTM D3037) of said support material ranges from about 20 to about 350 $m^2/g$. The support material may contain small amounts of transition metals such as those of Groups IB, IIB, VB, VIB, VIIB and VIII of the Periodic Table (e.g., Mo and Ni) or compounds thereof, generally at a level of less than 0.4 weight-% metals, based on the weight of the entire support material (before impregnation). It is within the scope of this invention (yet less preferred) to employ mixtures of the support material with substantially unpromoted inorganic refractory materials such as clay, magnesia, titania, zirconia, aluminum phosphate, zirconium phosphate, alumina-titania, zeolite, zeolite-alumina, zeolite-silica and the like. Generally the above-mentioned essentially unpromoted materials will not exceed about 2 weight-%, based on the weight of the support material (before impregnation).

Any suitable lanthanide compounds can be employed in the preparation of the catalyst composition by impregnation, as long as it is soluble in water. Non-limiting examples are $LaCl_3$, $La(NO_3)_3$, $La_2(SO_4)_3$, $La(CH_3CO_2)_3$, $CeCl_3$, $Ce(NO_3)_3$, $Ce_2(SO_4)_3$, $Ce(CH_3CO_2)_3$, the corresponding chlorides, nitrates, sulfates and acetates of Pr, Nd, Pm, Sm, Eu, Gd, Tb, Dy, Ho, Er, Tm, Yb and Lu, and mixtures thereof. Any suitable manganese compound, if used, can be employed such as $MnCl_2$, $MnBr_2$, $Mn(NO_3)_2$, $MnSO_4$, $Mn(CH_3CO_2)_2$, $MnCl_3$, $Mn_2(SO_4)_3$, and the like, and mixtures thereof. Presently preferred are $La(NO_3)_3$, $Ce(NO_3)_3$ and $Mn(NO_3)_3$. The concentration of these compounds in the aqueous impregnating solutions is not considered critical and is adjusted so as to attain the desired metal level in the finished catalyst composition.

The impregnation can be carried out in any suitable manner that results in an intimate mixture of the support material (preferably alumina) and the appropriate impregnating solution. The impregnating solution can be added to the support material, preferably with mechanical agitation. Or the support material can be added to the appropriate impregnating solution, preferably with mechanical agitation. Or the support material and the impregnating solution can be charged substantially simultaneously to a vessel, preferably with agitation. The temperature during impregnation can range from about 33° F. to about 220° F. and will generally be about 50°–100° F. The pressure during impregnation can be about atmospheric (14–15 psia) or subatmospheric (e.g., about 1–14 psia) or superatmospheric (e.g., about 15–100 psia). The preferred pressure is about atmospheric.

If desired, a separation step (e.g., filtration or centrifugation) and a washing step can be carried out after the impregnation step and before the drying step. It is understood that the impregnation can be done in one step (preferably) or in two or more sequential steps (e.g., first impregnation of $Al_2O_3$ with a La or Ce compound and then with a Mn compound).

In general, the catalyst composition is utilized for demetallization until a satisfactory level of metals removal is no longer achieved which generally results from the coating of the catalyst composition with coke and metals being removed from the feed. It is generally contemplated that once the removal of Ni and V falls below a desired level, the used (deactivated) catalyst will simply be replaced by a fresh catalyst.

Generally, at least a portion of the hydrotreated product stream having reduced nickel and vanadium content is subsequently cracked in a cracking reaction, e.g., in a fluidized catalytic cracking unit using a zeolite catalyst, under such conditions as to produce lower boiling hydrocarbon materials suitable for use as gasoline, diesel fuel, lubricating oils and other useful products. It is within the scope of this invention to hydrotreat said product stream having reduced nickel and vanadium content in one or more processes using a different hydrotreating catalyst composition, such as commercial alumina-supported $NiO/MoO_3$, $CoO/MoO_3$ or $NiO/CoO/MoO_3$ catalysts, for removal of sulfur, nitrogen and other impurities, before the product stream is introduced into the cracking reactor and treated under cracking conditions.

It is also within the scope of this invention (yet less preferred) to pass the hydrocarbon feed stream with hydrogen gas through a guard bed filled with a suitable demetallizing material such as alumina (with or without promoter metal) so as to remove some metals from the feed, before the feed is hydrotreated with the catalyst composition of this invention. It is also within the scope of this invention to employ one or more decomposable compounds of metals belonging to Groups IB, IIB, IVB, VB, VIB, VIIB, and VIII of the Periodical Table of Elements, preferably molybdenum hexacarbonyl, molydenum dithiophosphate and molybdenum dithiocarbamate, which are added to the hydrocarbon feed, in the hydrotreating process of this invention. Generally the metal content of these decomposable compounds in the feed is about 1–100 ppmw metal (preferably Mo), based on the entire feed stream.

The following examples are presented in further illustration of the invention and are not to be considered as unduly limiting the scope of this invention.

EXAMPLE I

This example illustrates the preparation of several alumina-supported hydrofining catalysts.

CATALYST A (CONTROL)

This catalyst was essentially unpromoted commercially available alumina. The surface area of this material was about 159 $m^2/g$ (determined by the $BET/N_2$ method; ASTM D3037); and its pore volume (determined by mercury intrusion using an Autopore 9200 instrument of Micromeretics, Norcross GA) was about 1.03 cc/g.

CATALYST B (INVENTION)

This catalyst contained 3.0 weight-% La (as oxide) on alumina support. Catalyst B was prepared by impregnating 30 grams of Catalyst A with a solution of 2.75 grams of $La(NO_3)_3$ in 80 cc of water. The impregnated material was dried at 125° C., heated (calcined) in air for 3 hours at 570° F. and then for 4 hours at 800° F.

CATALYST C (INVENTION)

This catalyst contained 3.0 weight-% Ce (as oxide) on alumina (as the carrier material). Catalyst C was prepared by impregnating 30 grams of Catalyst A with a solution of 2.75 grams of $Ce(NO_3)_3$ in 80 cc of water. The impregnated material was dried at 125° C., calcined in air for 3 hours at 300° C. and then for 4 hours at 427° C.

CATALYST D (CONTROL)

This catalyst contained 0.25 weight-% Mn (as oxide) on alumina support. It was prepared by impregnation of 30 grams of Catalyst A with an aqueous solution containing 1.5 grams of $Mn(NO_3)_2$. Drying and calcining was carried out in accordance with the procedure described for Catalysts B and C.

CATALYST E (INVENTION)

This catalyst contained 0.25 weight-% Mn (as oxide) and 3.0 weight-% La (as oxide) on alumina (as the carrier material). 30 grams of Catalyst A were impregnated with an aqueous solution containing 2.75 grams of $La(NO_3)_3$ and 1.5 grams of $Mn(NO_3)_2$. Drying and calcining was carried out in accordance with the procedure described for Catalysts B and C.

EXAMPLE II

This example illustrates the automated experimental setup for investigating the hydrofining of heavy oils in accordance with the present invention. Oil was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 40 cc of low surface area α-alumina (14 mesh Alundum; surface area less than 1 m2/gram), a middle layer of a mixture of 50 cc of hydrofining catalyst (A, B, C, D or E) and 70 cc of 36 mesh Alundum, and a bottom layer of about 30 cc of Alundum.

The oil feed was a Maya 400F+ residuum containing about 4.0 weight-% sulfur, about 64 ppmw (parts per million by weight) nickel and about 331 ppmw vanadium.

Hydrogen was introduced into the reactor through a tube that concentrically surrounded the oil induction tube but extended only to the reactor top. The reactor was heated with a 3-zone furnace. The reactor temperature was measured in the catalyst bed at three different locations by three separate thermocouples embedded in axial thermocouple well. The liquid product oil was generally collected every day for analysis. Excess hydrogen gas was vented. The concentrations of vanadium and nickel in the oil were determined by plasma emission analysis; sulfur content was measured by X-ray fluorescence spectrometry.

EXAMPLE III

This example illustrates the removal of nickel and vanadium from the heavy oil feed (containing a total of 395 ppmw Ni+V) in the presence of Catalysts A–E at a temperature of about 750° F., a pressure of about 1400 psig, a feed rate of about 0.5 LHSV (volume feed per volume catalyst per hour), and hydrogen addition of 3,000 standard cubic feet (SCF) H2 per barrel of feed. The percent removed of V and Ni (sum of ppmw of Ni and ppmw V divided by 395, then multiplied by 100) was corrected for variations in flow rate, based on first order Kinetics, so as to give results we would have obtained at 0.5 LHSV. Pertinent results are summarized in Table I.

(b) Invention Catalyst C (with Ce) was more effective than invention Catalyst B (with La) in removing Ni and V;

(c) invention Catalyst E (with Mn and La) was more effective than control Catalyst D (with Mn) and also more effective than invention Catalyst B (with La) in removing Ni and V.

Based on these results, catalyst E and C are considered the more preferred hydrofining catalysts for the process of this invention.

Reasonable variations and modifications are possible within the scope of the disclosure and the appended claims.

We claim:

1. A hydrotreating process comprising the step of simultaneously contacting a substantially liquid hydrocarbon-containing feed stream, which contains at least about 5 ppmw nickel and at least about 10 ppmw vanadium, with a free hydrogen containing gas and a catalyst composition consisting essentially of (a) alumina and (b) cerium oxide, under such contacting conditions as to obtain a product stream having reduced levels of nickel and vanadium.

2. A process in accordance with claim 1, wherein said hydrocarbon-containing feed stream contains about 5–500 ppmw nickel and about 10–1,000 ppmw vanadium.

3. A process in accordance with claim 1, wherein said hydrocarbon-containing feed stream is selected from the group consisting of crude oil, crude oil fractions, petroleum products, heavy oil extracts, coal pyrolyzates, liquified coal products, products from tar sand, shale oil and shale oil products.

4. A process in accordance with claim 1, wherein the weight percentage of said component (b) in said catalyst composition is in the range of from about 0.5 to 10 weight-%.

TABLE I

| Run | Catalyst | Days on Stream | LHSV (cc/cc/hr) | Product ppmw Ni | Product ppmw V | % Removal (Ni + V) | Corrected % Removal (Ni + V) |
|---|---|---|---|---|---|---|---|
| 1 | A | 1 | 0.48 | 54 | 300 | 10.4 | 10.0 |
| (Control) | | 1 | 0.48 | 54 | 304 | 9.4 | 9.0 |
| | | 2 | 0.55 | 54 | 309 | 8.1 | 8.9 |
| | | 3 | 0.48 | 60 | 313 | 5.4 | 5.3 |
| | | | | | | | Average: 8.3 |
| 2 | B | 1 | 0.53 | 53.9 | 263.6 | 19.6 | 21.3 |
| (Invention) | (3% La) | 2 | 0.53 | 56.4 | 257.3 | 20.6 | 21.3 |
| | | 3 | 0.53 | 52.2 | 213.3 | 32.8 | 34.3 |
| | | | | | | | Average: 25.6 |
| 3 | C | 1 | 0.53 | 57.6 | 233.8 | 26.2 | 27.4 |
| (Invention) | (3% Ce) | 2 | 0.53 | 52.5 | 195.4 | 37.2 | 39.4 |
| | | 3 | 0.53 | 49.6 | 182.6 | 41.2 | 42.9 |
| | | | | | | | Average: 36.6 |
| 4 | D | 1 | 0.57 | 56.5 | 255.9 | 20.9 | 24.4 |
| (Control) | (0.25% Mn) | 2 | 0.52 | 56.3 | 271.4 | 17.0 | 16.5 |
| | | 3 | 0.50 | 58.8 | 238.8 | 24.6 | 24.6 |
| | | | | | | | Average: 21.8 |
| 5 | E | 1 | 0.49 | 55.3 | 232.0 | 27.1 | 28.8 |
| (Invention) | (0.25% Mn + | 2 | 0.46 | 54.6 | 197.2 | 36.3 | 34.3 |
| | 3.0% La) | 3 | 0.43 | 50.1 | 174.4 | 43.2 | 38.1 |
| | | | | | | | Average: 33.7 |

Data in Table I show:

(a) Invention Catalysts B, C and E were more effective in removing Ni and V than control Catalysts A and D;

5. A process in accordance with claim 1, wherein the weight percentage of said component (b) in said catalyst composition is in the range of from about 1.0 to about 5.0 weight-%.

6. A process in accordance with claim 1, wherein said contacting conditions comprise a reaction temperature in the range of from about 250° to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet $H_2$ per barrel of the hydrocarbon-containing feed stream.

7. A process in accordance with claim 1 wherein said contacting conditions comprise a reaction temperature in the range of from about 250° to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet $H_2$ per barrel of hydrocarbon-containing feed stream, and component (b) of said catalyst composition is selected from the group consisting of $Ce_2O_3$ and $CeO_2$.

8. A process in accordance with claim 9, wherein said contacting conditions comprise a reaction temperature in the range of from about 350° to about 450° C., a reaction pressure in the range of from about 100 to about 2,500 psig, a reaction time in the range of from about 0.25 to about 5 hours, and an amount of added hydrogen gas in the range of from about 1,000 to about 6,000 standard cubic feet $H_2$ per barrel of the hydrocarbon-containing feed stream.

9. Process in accordance with claim 1, wherein said hydrocarbon-containing feed stream contains about 0.2–5 weight-% sulfur and said product stream has a reduced level of sulfur.

10. A hydrotreating process comprising the step of contacting a substantially liquid hydrocarbon-containing feed stream, which contains at least about 5 ppmw nickel and at least 10 ppmw vanadium, with a free hydrogen containing gas and a catalyst composition consisting essentially of alumina, (b) at least one compound of at least one lanthanide metal and (c) at least one compound of manganese, under such contacting conditions as to obtain a product stream having reduced levels of nickel and vanadium.

11. A process in accordance with claim 10, wherein said hydrocarbon-containing feed stream contains about 5–500 ppmw nickel and about 10–10,000 ppm vanadium.

12. A process in accordance with claim 10, wherein said hydrocarbon-containing feed stream is selected from the group consisting of crude oil, crude oil fractions, petroleum products, heavy oil extracts, coal pyrolyzates, liquified coal products, products from tar sand, shale oil and shale oil products.

13. A process in accordance with claim 10, wherein component (a) of said catalyst composition is alumina, component (b) of said catalyst composition is selected from the group consisting of lanthanum oxide and cerium oxides, and component (c) of said catalyst composition is selected from the group consisting of oxides of manganese.

14. A process in accordance with claim 13, wherein the weight-percentage of said component (b) in said catalyst composition is in the range of from about 0.5 to about 10 weight-%, and the weight percentage in said component (c) of said catalyst composition is in the range of from about 0.2 to about 5.0 weight-%.

15. A process in accordance with claim 13, wherein component (b) of said catalyst composition is $La_2O_3$ and component (c) of said catalyst composition is selected from the group consisting of oxides of manganese.

16. A process in accordance with claim 15, wherein the weight percentage of said component (b) in said catalyst composition is in the range of from about 1.0 to about 5.0 weight-%, and the weight percentage of said component (c) in said catalyst composition is in the range of from about 0.3 to about 3.0 weight-%.

17. A process in accordance with claim 10, wherein said contacting conditions comprise a reaction temperature in the range of from about 250° to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet $H_2$ per barrel of the hydrocarbon-containing feed stream.

18. A process in accordance with claim 10 wherein said contacting conditions comprise a reaction temperature in the range of from about 250 to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet $H_2$ per barrel of hydrocarbon-containing feed stream, and wherein component (b) of said catalyst composition is $La_2O_3$ and component (c) of said catalyst composition is selected from the group consisting of oxides of manganeses.

19. A process in accordance with claim 18, wherein said contacting conditions comprise a reaction temperature in the range of from about 350° to about 450° C., a reaction pressure in the range of from about 100 to about 2,500 psig, a reaction time in the range of from about 0.25 to about 5 hours, and an amount of added hydrogen gas in the range of from about 1,000 to about 6,000 standard cubic feet $H_2$ per barrel of the hydrocarbon-containing feed stream.

20. A process in accordance with claim 10, wherein said hydrocarbon-containing feed stream contains about 0.02–5 weight-% sulfur and said product stream has a reduced level of sulfur.

* * * * *